United States Patent
Tamura (10) Patent No.: US 10,179,605 B2
(45) Date of Patent: Jan. 15, 2019

(54) VEHICLE TRAVELING CONTROL APPARATUS

(71) Applicant: SUBARU CORPORATION, Tokyo (JP)

(72) Inventor: Yuichiroh Tamura, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/672,920

(22) Filed: Aug. 9, 2017

(65) Prior Publication Data

US 2018/0086373 A1 Mar. 29, 2018

(30) Foreign Application Priority Data

Sep. 23, 2016 (JP) ................................ 2016-185540

(51) Int. Cl.
*B62D 6/00* (2006.01)
*B62D 15/02* (2006.01)
(Continued)

(52) U.S. Cl.
CPC ............. *B62D 6/003* (2013.01); *B60W 10/20* (2013.01); *B60W 30/02* (2013.01); *B60W 40/06* (2013.01);
(Continued)

(58) Field of Classification Search
CPC ........ B62D 6/003; B62D 6/001; B62D 6/006; B62D 15/0255; B60W 40/06;
(Continued)

(56) References Cited

U.S. PATENT DOCUMENTS 7,194,347 B2 * 3/2007 Harumoto et al. ..........................
B60W 2550/14
701/45
2017/0371337 A1 * 12/2017 Ramasamy ........... B60W 40/06

FOREIGN PATENT DOCUMENTS

JP 2009-294943 A 12/2009
JP 2014-044141 A 3/2014
(Continued)

OTHER PUBLICATIONS

Office Action issued in corresponding Japanese Patent Application No. 2016-185540, dated Sep. 19, 2017.
(Continued)

*Primary Examiner* — Dale W Hilgendorf
(74) *Attorney, Agent, or Firm* — McDermott Will & Emery LLP (57) ABSTRACT

A vehicle traveling control apparatus includes a setter, a detector, and a determiner. The setter sets a lane-change route through which an own vehicle change lanes from a current target route to an adjacent lane. The detector detects a road surface pattern by irregularities on a road to which a lane change is to be made. The determiner determines whether the own vehicle interferes with the road surface pattern, and instructs correction of the set lane-change route based on a result of the determination. When there is not the interference, the determiner permits the lane change through the lane-change route. When there is the interference, the determiner instructs the setter to correct the lane-change route. The determiner permits the lane change through the corrected lane-change route when there is not the interference on the corrected lane-change route, and prohibits or cancels the lane change when there is still the interference.

5 Claims, 5 Drawing Sheets

(51) Int. Cl.
*B60W 40/06* (2012.01)
*B60W 10/20* (2006.01)
*B60W 30/02* (2012.01)
*B60W 10/18* (2012.01)
*G06F 17/12* (2006.01)

(52) U.S. Cl.
CPC ............. *B62D 6/001* (2013.01); *B62D 6/006* (2013.01); *B62D 15/0255* (2013.01); *G06F 17/12* (2013.01); *B60W 10/18* (2013.01); *B60W 2550/14* (2013.01); *B60W 2550/147* (2013.01)

(58) Field of Classification Search
CPC .. B60W 30/02; B60W 10/20; B60W 2550/14; B60W 2550/147; B60W 10/18; G06F 17/12
See application file for complete search history.

(56) References Cited

FOREIGN PATENT DOCUMENTS

| | | |
|---|---|---|
| JP | 2014-237412 A | 12/2014 |
| JP | 2015-168406 A | 9/2015 |
| JP | 2016-002978 A | 1/2016 |

OTHER PUBLICATIONS

Decision to Grant issued in corresponding Japanese Patent Application No. 2016-185540, dated Jan. 13, 2018.

\* cited by examiner

VEHICLE TRAVELING CONTROL APPARATUS

CROSS-REFERENCE TO RELATED APPLICATIONS

The present application claims priority from Japanese Patent Application No. 2016-185540 filed on Sep. 23, 2016, the entire contents of which are hereby incorporated by reference.

BACKGROUND

The technology relates to a vehicle traveling control apparatus that controls traveling of an own vehicle.

In vehicles such as automobiles, traveling controls such as a lane-keeping control and a follow-up traveling control have been known. The lane-keeping control recognizes a traveling environment around an own vehicle and allows for keeping of a traveling position of the own vehicle at a middle position of a lane. The follow-up traveling control also recognizes the traveling environment and allows for traveling while following a preceding vehicle ahead of the own vehicle. The recognition of the traveling environment of the own vehicle may be performed with, for example, a camera and a radar unit each mounted on the own vehicle.

In such a vehicle traveling control, a technique has been proposed that assists or automatically performs movement of the own vehicle to an adjacent lane by changing a traveling route of the own vehicle. The assistance or the automatic performance of the movement of the own vehicle to the adjacent lane is to be made at a time when the own vehicle overtakes a preceding vehicle traveling at a speed lower than that of the own vehicle, or at a time when a driver operates a direction indicator, or a winker, with an intention of changing lanes.

For example, Japanese Unexamined Patent Application Publication No. 2009-294943 discloses a technique of assisting the lane change. The disclosed technique of assisting the lane change is performed by: determining a vehicle traveling circumstance of a target lane into which the own vehicle is to proceed; determining whether there is any other vehicle that may possibly proceed into the target lane from a position other than the traveling lane along which the own vehicle travels; and setting guide information based on the vehicle in the target lane and the vehicle at a position other than the target lane.

SUMMARY

Such a technique intends to assist a lane change mainly in view of a traffic environment related to a relationship between an own vehicle and other vehicles traveling around the own vehicle.

Therefore, it is difficult to perform a proper lane change based on a road surface circumstance, depending on the circumstance of the surface of the road to which the lane change is to be made. For example, it is difficult to perform the proper lane change based on the road surface circumstance in a circumstance where a travelable region is limited, such as a circumstance where the road surface is raised due to snow covering a part of an adjacent lane.

It is desirable to provide a vehicle traveling control apparatus that makes it possible to perform a proper lane change based on a circumstance of a surface of a road to which a lane change is to be made.

An aspect of the technology provides a vehicle traveling control apparatus that includes a setter, a detector, and a determiner. The setter is configured to set, when controlling a lane change, a lane-change route that serves as a route through which an own vehicle is to proceed to an adjacent lane from a current target route of the own vehicle. The lane change allows for movement from a traveling lane to the adjacent lane. The traveling lane is a lane along which the own vehicle travels. The adjacent lane is positioned next to the traveling lane. The detector is configured to detect a road surface pattern formed by an irregular part on a surface of a road to which the lane change is to be made during the lane change. The determiner is configured to determine whether the own vehicle interferes, on the lane-change route, with the road surface pattern, and instructs, on a basis of a result of the determination, correction of the lane-change route set by the setter. In a case where determination is made that the own vehicle does not interfere with the road surface pattern, the determiner permits the lane change through the lane-change route. In a case where determination is made that the own vehicle interferes with the road surface pattern, the determiner: instructs the setter to correct the lane-change route; permits the lane change through the corrected lane-change route when determination is made that the own vehicle does not interfere, on the corrected lane-change route, with the road surface pattern; and prohibits or cancels the lane change when determination is made that the own vehicle still interferes, on the corrected lane-change route, with the road surface pattern.

An aspect of the technology provides a vehicle traveling control apparatus that includes circuitry. The circuitry is configured to: set, when controlling lane change, a lane-change route that serves as a route through which an own vehicle is to proceed to an adjacent lane from a current target route of the own vehicle, in which the lane change allows for movement from a traveling lane to the adjacent lane, in which the traveling lane is a lane along which the own vehicle travels, and in which the adjacent lane is positioned next to the traveling lane; detect a road surface pattern formed by an irregular part on a surface of a road to which the lane change is to be made during the lane change; determine whether the own vehicle interferes, on the lane-change route, with the road surface pattern; and instruct, on a basis of a result of the determination, correction of the set lane-change route. In a case where determination is made that the own vehicle does not interfere with the road surface pattern, the circuitry permits the lane change through the lane-change route. In a case where determination is made that the own vehicle interferes with the road surface pattern, the circuitry: instructs the correction of the lane-change route; permits the lane change through the corrected lane-change route when determination is made that the own vehicle does not interfere, on the corrected lane-change route, with the road surface pattern; and prohibits or cancels the lane change when determination is made that the own vehicle still interferes, on the corrected lane-change route, with the road surface pattern.

DETAILED DESCRIPTION

Figure 1:
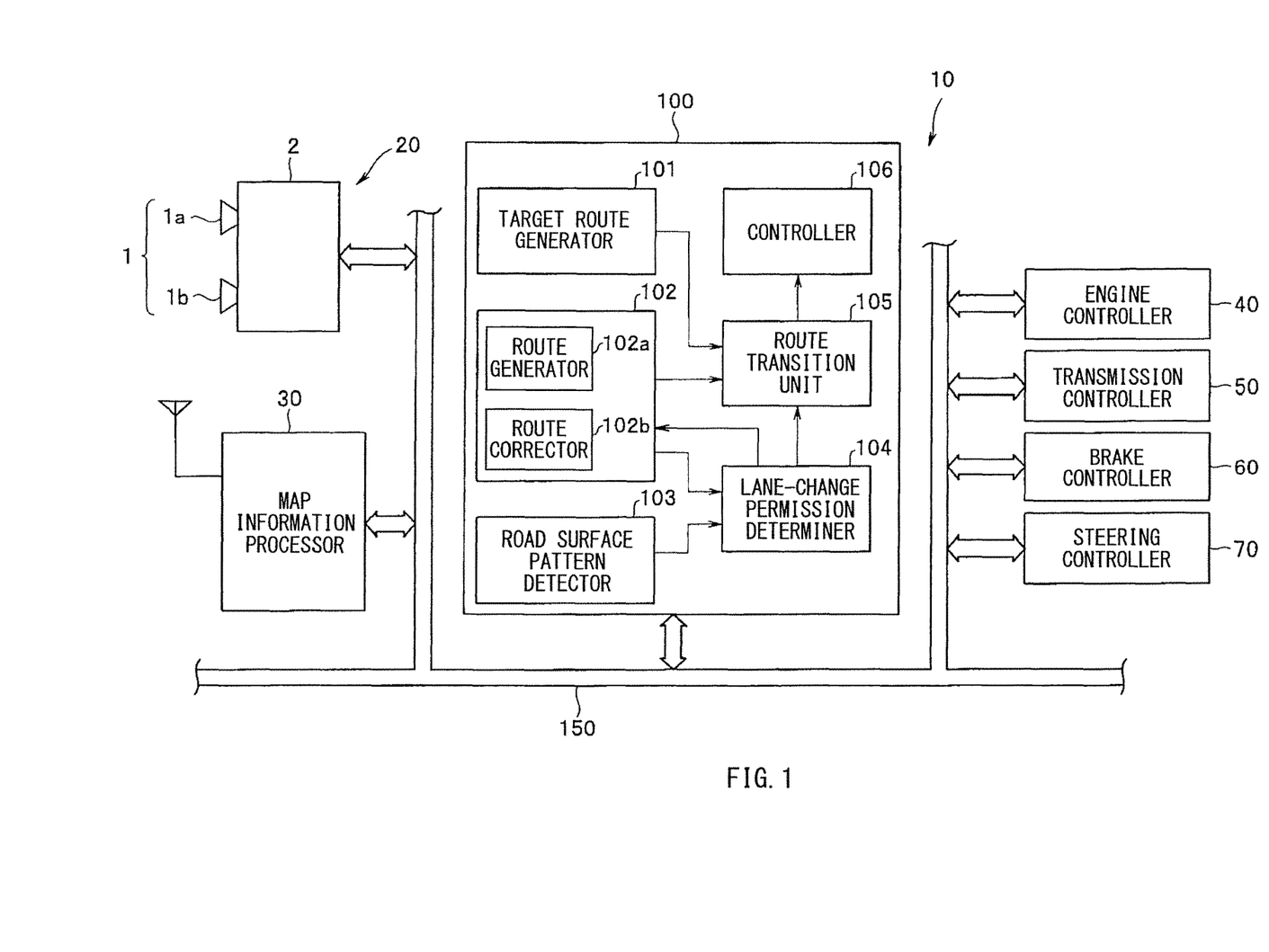
FIG. 1 illustrates an example of a configuration of a traveling control system according to an implementation of the technology.

Description is given below, with reference to the accompanying drawings, of some implementations of the technology. FIG. 1 illustrates a traveling control system 10 of a vehicle such as an automobile. The traveling control system 10 performs a traveling control including autonomous automatic driving of the vehicle. The traveling control system 10 may include, for example, a traveling controller 100 as a central device, an outside environment recognizer 20, a map information processor 30, an engine controller 40, a transmission controller 50, a brake controller 60, and a steering controller 70, which may be coupled to one another via a communication bus 150 that forms an intra-vehicle network.

The outside environment recognizer 20 may recognize an outside environment around an own vehicle by means of information such as, but not limited to, information on detection of an object around the own vehicle and traffic information. The information on the detection of the object around the own vehicle may be obtained using various devices such as, but not limited to, an on-vehicle camera, a millimeter-wave radar, and a laser radar, i.e., light detection and ranging (LIDAR). The traffic information may be obtained through infrastructure communication such as, but not limited to, road-to-vehicle communication and vehicle-to-vehicle communication. In an implementation of the technology, as the outside environment recognizer 20, an on-vehicle camera 1 and an image recognizer 2 are adopted to mainly describe recognition of the outside environment by the on-vehicle camera 1 and the image recognizer 2.

In an implementation of the technology, the camera 1 may be a stereo camera including two cameras 1a and 1b that capture images of the same object from different perspectives. The cameras 1a and 1b may be shutter-synchronized cameras each including an imaging device such as a charge-coupled device (CCD) and a complementary metal oxide semiconductor (CMOS). The cameras 1a and 1b may be disposed with a predetermined base line length in vicinity of a rear-view mirror on inner side of a windshield, in an upper part of vehicle interior, for example.

A pair of right and left images captured by the camera 1 may be processed by the image recognizer 2. The image recognizer 2 may determine a pixel offset amount (parallax) between the right and left images at a corresponding position by a stereo matching processing, and may convert the pixel offset amount into data such as luminance data to generate a distance image. A point on the distance image may be coordinate-transformed, on principle of triangulation, to a point in a real space having an X-axis as a vehicle width direction, i.e., a right-left direction of the own vehicle; a Y-axis as a vehicle height direction; and a Z-axis as a vehicle length direction, i.e., a distance direction. Thus, lane lines on a road, e.g., white lines or any other colored lines along which the own vehicle is to travel, an obstacle, a vehicle traveling ahead of the own vehicle, or other objects may be three-dimensionally recognized.

The lane line on a road, such as the white line is recognizable by extracting, from the image, a group of points that may be a proposed lane line, and calculating a straight line or a curve that connects the proposed points. For example, in a lane line detection region set on the image, an edge may be detected whose luminance is varied by a predetermined value or more on a plurality of search lines set in a horizontal direction (vehicle width direction) to detect a set of a lane line start point and a lane line end point for each search line. Thus, a middle region between the lane line start point and the lane line end point may be extracted as a proposed lane line point.

Thereafter, time-series data of a spatial coordinate position of the proposed lane line point, based on the vehicle movement amount per unit time, may be obtained. The obtained time-series data may be processed to calculate a model approximate to the right lane line and the left lane line. This calculated model allows the lane line to be recognized. As the approximate model of the lane line, an approximate model of coupled linear components determined by Hough transform, an approximate model of a curve such as a quadratic, or any other suitable approximate model may be used.

The map information processor 30 may include a map database, and may measure a position of the own vehicle on the basis of a signal received from, for example but not limited to, a satellite for global positioning system (GPS) to collate the determined position of the own vehicle with map data. The map database may include the map data used to display a route guide for vehicle traveling as well as a current position of the vehicle. The map data may also include high-definition map data used to perform a drive assist control including automatic driving.

The map information processor 30 may propose to a driver a driving route guide and traffic information, via an unillustrated display, based on the collation between a measurement result of the position of the own vehicle and the map data. Further, the map information processor 30 may output road shape data of factors such as road curvature, lane width, and a road shoulder of a road along which the own vehicle and a preceding vehicle are to travel, as well as map information used for traveling control, such as a road azimuth angle, types of lane lines of the road, and the number of lanes.

The engine controller 40 may control a driving state of an unillustrated engine on the basis of signals from various sensors that detect the engine driving state and various pieces of control information transmitted via the communication bus 150. The engine controller 40 may perform an engine control on the basis of, for example but not limited to, intake air volume, throttle opening angle, engine water temperature, intake air temperature, air-fuel ratio, crank angle, accelerator position, and other vehicle information. Non-limiting examples of the principal engine control may include fuel injection control, ignition timing control, and control of the opening angle of an electronically-controlled throttle valve.

The transmission controller 50 may control oil pressure to be supplied to an unillustrated automatic transmission on the basis of signals received from sensors or on the basis of various pieces of control information. The sensors may detect a transmission position and a vehicle speed, for example. The various pieces of control information may be transmitted via the communication bus 150. Thus, the transmission controller 50 may control the automatic transmission in accordance with preset transmission characteristics.

The brake controller 60 may control unillustrated brake devices of four wheels independently of a braking operation performed by a driver, on the basis of, for example but not limited to, a brake switch, wheel speed of each of the four wheels, a steering wheel angle, a yaw rate, and other vehicle information. The brake controller 60 may also perform, for example, an antilock brake system and an antiskid control by calculating braking fluid pressure to be applied to each wheel on the basis of brake force of each wheel.

The steering controller 70 may control assist torque derived from an unillustrated electric power steering motor provided in a steering system of the vehicle, on the basis of, for example but not limited to, the vehicle speed, the steering torque based on an input received from a driver, the steering wheel angle, the yaw rate, and other vehicle information. The steering controller 70 may also perform, in accordance with an instruction from the traveling controller 100, driving control of the electric power steering motor with a steering amount that allows for following a traveling trajectory of the preceding vehicle, during follow-up traveling to follow the preceding vehicle traveling ahead of the own vehicle.

Description is given next of the traveling controller 100 as a central device of the traveling control system 10. The traveling controller 100 may generate a target route based on, as a trajectory, a middle position of a current traveling lane on the basis of a recognition result of the outside environment made by the outside environment recognizer 20. The traveling controller 100 may also perform the traveling control via the engine controller 40, the transmission controller 50, the brake controller 60, and the steering controller 70 to allow for traveling along the target route at a set vehicle speed.

The traveling controller 100 may set a lane-change route that may serve as a route for a lane change when the driver operates a direction indicator or any other setting switch or when a condition of automatically overtaking the preceding vehicle during automatic driving is satisfied. The driver's operation of the direction indicator or any other setting switch may be performed in, for example but not limited to, a case where the own vehicle overtakes the preceding vehicle traveling ahead at a speed lower than that of the own vehicle. Thereafter, determination may be made as to whether proper movement is possible by traveling through the lane-change route on the basis of a road surface pattern of a road to which the lane change is to be made. The road surface pattern may be a pattern formed by an irregular part on the road surface, and may indicate a circumstance of the surface of the road to which the lane change is to be made. The irregular part on the road surface may vary in its height with respect to a plane of the road.

The traveling controller 100 may determine whether it is possible for the own vehicle to travel properly, on the lane-change route, without interfering with the road surface pattern formed by the irregular part on the road surface, in particular, with a part raised from the road surface. When determination is made that the proper traveling is possible, the traveling controller 100 may permit the lane change to be performed by automatic steering to steer the own vehicle to the lane-change route. In contrast, when determination is made that the proper traveling is not possible, the lane change may be canceled even after the driver has actuated the direction indicator, thus preventing possible occurrence of any concern. The determination that the proper traveling is not possible may be made when the raised part of the surface pattern of the road to which the lane change is to be made interferes with the own vehicle on the lane-change route and thus servers as a traveling obstacle to the own vehicle.

To achieve such a control, as illustrated in FIG. 1, the traveling controller 100 may include a target route generator 101, a lane-change route setter 102, a road surface pattern detector 103, a lane-change permission determiner 104, a route transition unit 105, and a controller 106. Note that the lane-change route setter 102 may include a route generator 102a and a route corrector 102b.

The target route generator 101 may use, as a target point, a middle position between the right lane line and the left lane line to generate a trajectory of the target point as the target route. Description is given of an example of generating the target route by expressing the trajectory of the target point by a quadratic curve according to an implementation of the technology.

When generating the target route based on information on the lane lines, lane line proposed points detected on an image for image coordinate systems may be mapped onto respective coordinate systems in a real space. The lane line proposed points on the image may be, for example, proposed points located at about 7 meters to about 8 meters on near side to about 100 meters on distant side; all of the lane line proposed points may be mapped onto the real space. Thereafter, the lane line proposed points successfully detected on the image may be collated with past lane line data estimated on the basis of a movement amount of the own vehicle to identify an approximate curve for each of the proposed points.

Figure 2:
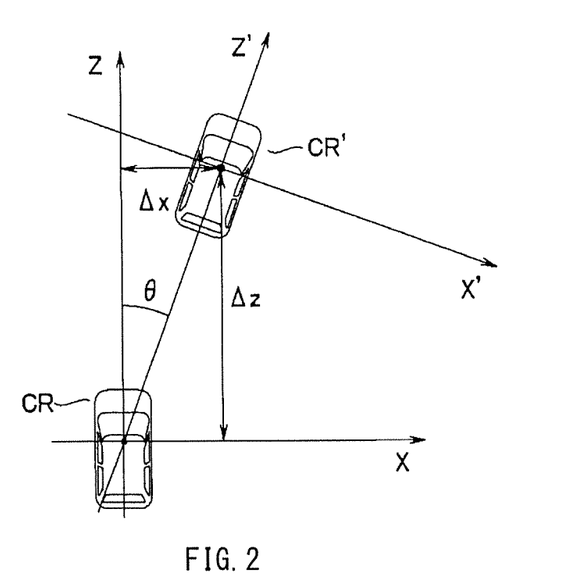
FIG. 2 describes an example of a vehicle movement amount.

In one specific but non-limiting example, for example, the proposed point P as a target for each frame may be determined on the basis of the movement amount of the own vehicle per frame of an image captured by the camera 1, and a curve that approximates the group of points for the proposed point P may be calculated as the target route. To be more specific, from a relationship illustrated in FIG. 2, on the basis of vehicle speed V of an own vehicle CR and a yaw angle θ determined by a yaw rate of the own vehicle CR, movement amounts Δx and Δz toward the own vehicle CR' at a frame rate Δt (i.e., a period of time until the captured image is updated by one frame) may be calculated using the following expressions (1) and (2).

$$\Delta x = V \cdot \Delta t \cdot \sin \theta \quad (1)$$

$$\Delta z = V \cdot \Delta t \cdot \cos \theta \quad (2)$$

Thereafter, the movement amounts Δx and Δz of the own vehicle may be subtracted from proposed points Pold (Xold, Zold), which are detected prior to a previous frame, in a vehicle fixed coordinate system (X, Y). Thereafter, coordinate transformation to a vehicle fixed coordinate system (X', Z') in a current frame may be performed to calculate coordinates of proposed points Ppre (Xpre, Zpre) in the current frame, as represented by the following expressions (3) and (4).

$$Xpre = (Xold - \Delta x) \cdot \cos \theta - (Zold - \Delta z) \cdot \sin \theta \quad (3)$$

$$Zpre = (Xold - \Delta x) \cdot \sin \theta + (Zold - \Delta z) \cdot \cos \theta \quad (4)$$

Figure 3:
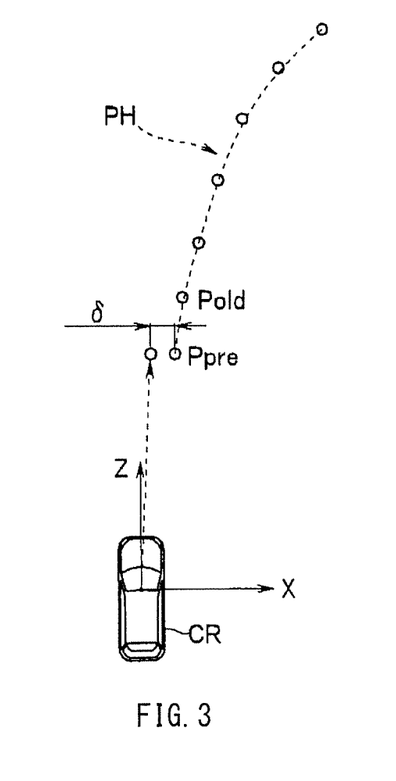
FIG. 3 describes an example of a trajectory of a target point.

Thereafter, for example, least-square method may be applied to the group of proposed points to determine a route PH in which the trajectory of the proposed points is expressed by a quadratic curve, as represented by the following expression (5), to set the route PH as the target route, as illustrated in FIG. 3.

$$X = A \cdot Z^2 + B \cdot Z + C \quad (5)$$

In the expression (5), coefficients A, B, and C denote route components that constitute the target route. The coefficient A denotes a curvature component of the target route. The coefficient B denotes a yaw angle component of the target route with respect to the own vehicle, i.e., an angle component between a longitudinal direction axis of the own vehicle and the target route (tangent). The coefficient C denotes a lateral-directional position component (lateral position component) of the target route with respect to the own vehicle.

Note that, as for the target route using the lane lines, the middle position between the proposed points of each of the right lane line and the left lane line may be used as the target point to calculate the curve based on the expression (5) from the middle target point. More accurately, however, the curve based on the expression (5) may be calculated for each of the right lane line and the left lane line to set, as the target route, the trajectory of the middle position determined by the right and left curves.

The lane-change route setter 102 may cause the route generator 102a to generate the lane-change route, and may transmit the generated lane-change route to the lane-change permission determiner 104. Further, when the lane-change permission determiner 104 instructs the lane-change route setter 102 to perform route correction, the lane-change route setter 102 may cause the route corrector 102b to correct the lane-change route.

To be more specific, the route generator 102a may generate, by means of a predetermined route model, a trajectory of the own vehicle that moves as a result of changing lanes to thereby calculate a route component of the movement trajectory necessary for a steering control for the lane change. In an implementation of the technology, as the route model that generates the lane-change route, a function as represented by the following Expression (6) may be used.

$$X = H \cdot Z/L - H \cdot \sin(2\pi Z/L)/2\pi \quad (6)$$

The function of the route model may be used to prepare a sequence of points. Least-square method may be applied to the prepared sequence of points to calculate a curvature component, an angle component, and a position component of the route.

Figure 4:
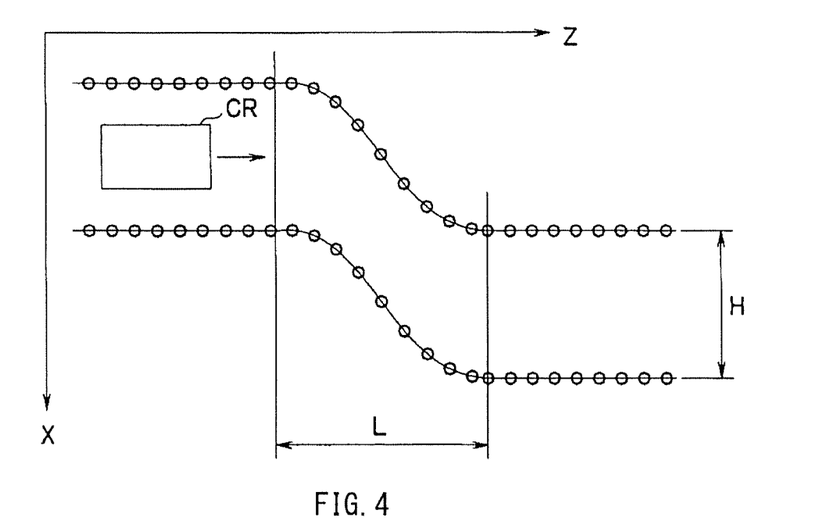
FIG. 4 describes an example of a route model of a lane change.

Parameters H and L in Expression (6) may be route parameters for the lane change. As illustrated in FIG. 4, the route parameter H denotes a road width in the lane change. The road width in the lane change may indicate how much lateral movement is made by the own vehicle CR through the lane change. The route parameter L may indicate a zone to be determined by a distance or time necessary for the lane change. Note that FIG. 4 exemplifies the lane change in a straight road.

In one specific but non-limiting example, when it is possible to detect a width of a lane along which the own vehicle travels or an adjacent lane, a width of the adjacent lane may be used as the route parameter H. Further, the route parameter L may be set to have a unique value on the basis of the vehicle speed. For example, the route parameter L may be set by multiplying the vehicle speed by a predetermined distance coefficient (i.e., L=vehicle speed×distance coefficient).

Thereafter, the route model represented by Expression (6) may be developed into the sequence of points. The sequence of points may be approximated with a quadratic function to determine the route components, such as the curvature component, the yaw angle component, and the lateral position component, which are necessary for the steering control for the lane change. In other words, the function represented by Expression (6) may be used to prepare the sequence of points for a position of the own vehicle that varies momentarily. A quadratic least square approximate expression may be applied to the sequence of points. Thereafter, a curvature component D, a yaw angle component E, and a lateral position component F may be calculated as represented by the following Expression (7).

$$X = D \cdot Z^2 + E \cdot Z + F \quad (7)$$

The curvature component D, the yaw angle component E, and the lateral position component F in Expression (7) may serve as physical values for the steering control that allows for the lane change, separately from the steering amount that allows for keeping the middle position of the lane to follow the target route as represented by Expression (5). The curvature component D, the yaw angle component E, and the lateral position component F, in Expression (7) may vary momentarily in accordance with the position of the own vehicle.

When determination is made that the own vehicle interferes, on the lane-change route, with the road surface pattern, the route corrector 102b may correct the lane-change route. The correction of the lane-change route may be performed by varying the route parameter L or the route parameter H of the route model, as described below in (a) and (b).

[(a) Varying Route Parameter L] Decreasing the route parameter L may enable the lane change to be performed in a shorter zone. On the other hand, increasing the route parameter L may allow the lane change to be performed in a longer distance. Thus, when determination is made that the own vehicle interferes with the road surface pattern, the route parameter L may be increased to allow the lane change to be performed in a longer zone, thereby making it possible to prevent the own vehicle from interfering with the road surface pattern.

[(b) Varying Route Parameter H]

Decreasing the route parameter H may enable lateral movement width in the lane change to be smaller. For example, in a situation where there is a snow wall present very close just outside the adjacent lane, decreasing the route parameter H may enable the lane change to be performed with such a steering control as not to give a driver a sense of fear.

The road surface pattern detector 103 may detect a road surface pattern formed by the irregular part on the surface of the road to which the own vehicle is to change lanes. The road surface pattern as mentioned here may be a texture to be mapped in accordance with an irregular state in which height from the plane of the road is varied due to, for example but not limited to, a snow wall as a result of snowfall or remaining snow, a fallen object on the road, or a stopped vehicle on a road shoulder. The road surface as mentioned here may also include a recessed part due to, for example but not limited to, depression of the road itself.

In an implementation of the technology, the road surface pattern detector 103 may detect, as the road surface pattern, a region of a raised part which has height equal to or greater than a threshold value with respect to height of the road surface of the lane line in a vertical direction and which has the texture present on an image. Description is given here in which the road surface pattern formed by the snow wall on the road is exemplified as the road surface pattern of the raised part.

The road surface pattern formed by the snow wall may be obtained through searching of a road surface region on the image and three-dimensional plotting of the road surface region from parallax and a coordinate value of a part in which a variation in luminance is equal to or higher than a threshold value. For example, by checking whether the road surface pattern is located at a position higher or lower than height of the lane line at the middle position of the road, it becomes possible to detect the road surface pattern formed by the snow wall.

Figure 5:
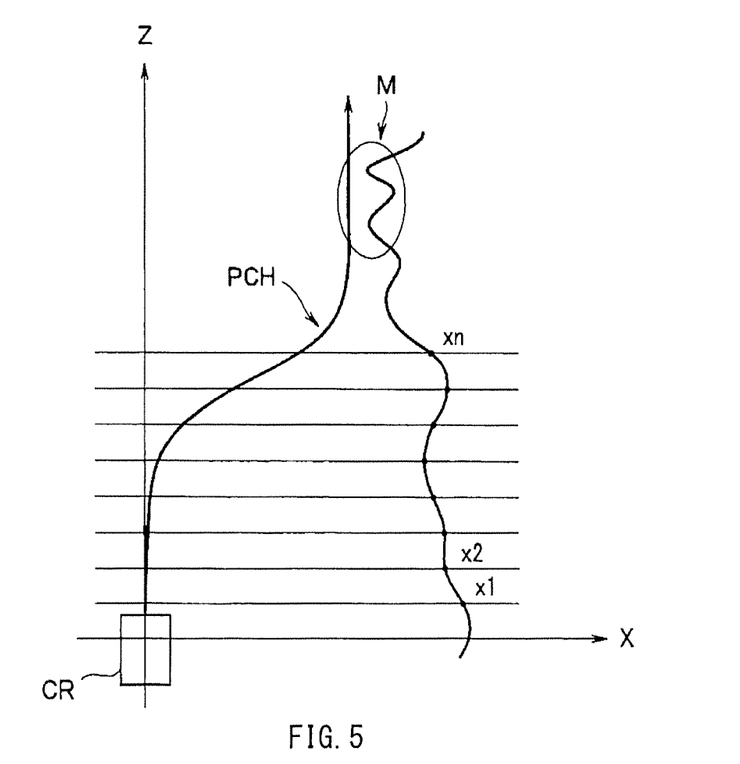
FIG. 5 describes an example of detection of a road surface pattern.
Figure 6:
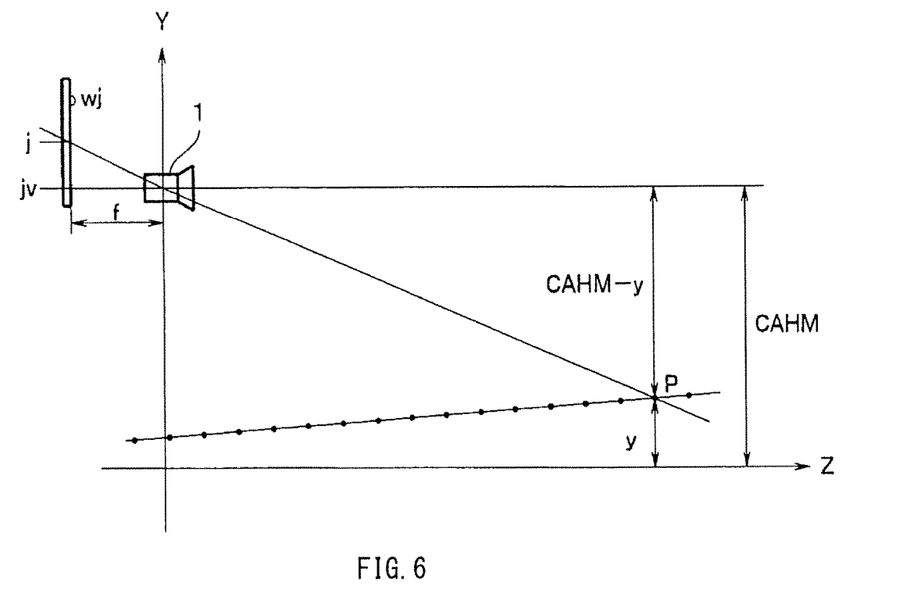
FIG. 6 describes an example of height and distance of points, on a plane of a road, which correspond to respective pixels on an image.
Figure 7:
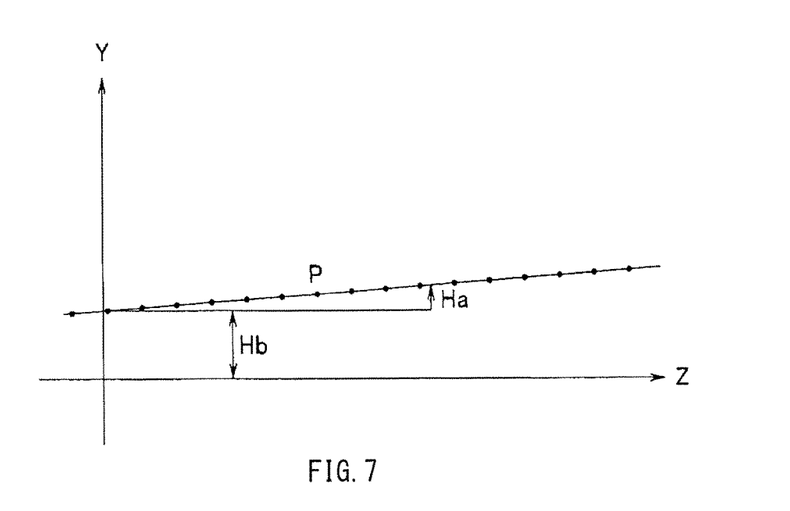
FIG. 7 describes an example of an approximate expression of the height and the distance of the points on a road surface.

To be more specific, in relation to FIGS. 5 thru 7, the image may be searched horizontally to calculate, for a location where an edge value as the variation in luminance of the image exceeds a threshold value, a Y coordinate of the location in a vertical direction of the vehicle from a coordinate (i, j) on the image (where i corresponds to the horizontal location on the image, and j corresponds to the vertical location on the image) and a parallax value d. Thereafter, a part where a Y coordinate value of the road surface pattern is higher or lower than a Y coordinate value of the height of the lane line may be detected as a position to be an obstacle. The Y coordinate value of the road surface pattern higher than the Y coordinate value of the height of the lane line may be equal to or higher than a higher-position threshold value. The Y coordinate value of the road surface pattern lower than the Y coordinate value of the height of the lane line may be equal to or lower than a lower-position threshold value. Thereafter, an innermost X coordinate value (x1, x2, . . . , xn illustrated in FIG. 5) closest to the own vehicle CR may be calculated at each predetermined interval, e.g., at each one meter in a vehicle traveling direction, i.e., in Z-direction.

Note that the Y coordinate value (i.e., height) of each point P on the road surface may be determined from a positional relationship with respect to a distance Z in the vertical direction as illustrated in FIG. 6. The distance Z may be calculated mainly from a baseline length La (e.g. distance between stereo cameras) of the stereo camera 1, a focal distance f of a camera lens, and the parallax value d as represented by the following Expression (8-1). The Y coordinate value (i.e., height) of each point P on the road surface may be determined by a linear expression represented by the following Expression (8-2).

$$Z = La \cdot f/(d \cdot wi) \quad (8\text{-}1)$$

$$Y = Z \cdot wj \cdot (j-jv)/f + CAHM \quad (8\text{-}2)$$

In Expressions (8-1) and (8-2), wi denotes a pixel pitch (in horizontal direction); wj denotes a pixel pitch (in vertical direction); jv denotes a position of a light axis (j coordinate of an infinite-point in front of the own vehicle); and CAHM denotes height from the origin to the center of the camera, i.e., the center of the lens.

As illustrated in FIG. 7, the coefficients of the linear expression of Expression (8-2) may be identified by applying the least-square method to a sequence of points obtained by calculating coordinates (y, z) of respective points P, and may be determined as coefficients Ha and Hb of an approximate expression represented by the following Expression (9).

$$Y = Ha \cdot Z + Hb \quad (9)$$

The lane-change permission determiner 104 may determine, when the own vehicle starts changing lanes, whether the own vehicle on a lane route interferes with the road surface pattern on the surface of the road to which the lane change is to be made, and may instruct correction of the lane-change route depending on a result of the determination. The time at which the own vehicle starts changing lanes may be, for example but not limited to, a timing at which the driver actuates the direction indicator, or a timing at which transition is made from the actuation of the direction indicator to a lane-change control. For example, as illustrated in FIG. 5, determination may be made as to whether, when the own vehicle CR moves along a lane-change route PCH, whether a raised part M that forms the road surface pattern interferes with the own vehicle CR and thus servers as an obstacle.

As a result, when determination is made that the own vehicle interferes, on the lane-change route, with the road surface pattern, the lane-change permission determiner 104 may instruct the route corrector 102*b* to correct the lane-change route. Upon reception of the instruction of the correction from the lane-change permission determiner 104, the route corrector 102*b* may sequentially increase the route parameter L of the lane-change route from an initial value (e.g., 30 m) to a predetermined distance by a predetermined interval, e.g., by 1 m.

The lane-change permission determiner 104 may determine the interference of the own vehicle with the road surface pattern every time the route parameter L is increased. When the route parameter L determined to cause no interference with the road surface pattern is obtainable as a value equal to or lower than an upper limit threshold value within a correctable range, the lane-change permission determiner 104 may finalize the lane-change route of that route parameter L as a final lane-change route to permit lane change through the finalized lane-change route.

On the other hand, in a case where determination is made that the interference still occurs even when the route parameter L is increased to the upper limit threshold value, the route parameter L may be returned to the initial value, while the other route parameter H may be decreased. In a case where determination is made that there is no interference with the road surface pattern before the route parameter H reaches a lower limit threshold value within the correctable range, the lane-change permission determiner 104 may finalize the lane-change route of the route parameter H as the final lane-change route to permit the lane change through the finalized lane-change route.

In contrast, in a case where determination is made that the interference still occurs even when the route parameter H is decreased to the lower limit threshold value, the lane change may be canceled. In this case, the lane change may be so canceled as not to start the lane change even when the driver actuates the direction indicator. Further, even after the lane-change control has been actually started, the lane change is prohibited at a time when it is confirmed that the above-described conditions hold true and thus there is the interference with the road surface pattern.

When the route change is permitted by the lane-change permission determiner 104, the route transition unit 105 may add route components D, E, and F of the lane-change route, respectively, to the route components A, B, and C of the target route before the lane change to calculate route components Ai, Bi, and Ci that are necessary for the steering control for the lane change, as represented by the following Expressions (10) to (12).

$$Ai = A + D \quad (10)$$

$$Bi = B + E \quad (11)$$

$$Ci = C + F \quad (12)$$

Thereafter, the route transition unit 105 may output the route components Ai, Bi, and Ci to the controller 106, and may allow the own vehicle to transit from the lane route of the current lane to the lane-change route. Note that, after the lane change has been completed, the route transition unit 105 may allow the own vehicle to return to the target route from the lane-change route.

The controller 106 may correct a current steering angle of the own vehicle by means of the steering controller 70 so as to allow the middle position in the vehicle width direction of the own vehicle to coincide with the target point on the target route, thereby controlling the follow-up traveling to follow the target route. The steering control for the target point may be performed mainly using a feedback control for deviation δ (see FIG. 3) between the target point and an estimated lateral position of the own vehicle at a predetermined distance when advancing at the current steering angle. The steering control for the control target point may also be performed using a feedback control for a relative yaw angle between the target route and the own vehicle, and a feedforward control for the curvature of the target route.

Note that it is possible to calculate the estimated lateral position of the own vehicle at the predetermined distance using, for example but not limited to, the steering angle, the vehicle speed, a vehicle-specific stability factor, a wheelbase, and a steering gear ratio. Alternatively, it is also possible to calculate the estimated lateral position of the own vehicle at the predetermined distance using a yaw rate of the own vehicle detected by a sensor.

For example, the following steering control amounts may be added to calculate a target steering angle αref, as represented by the following expression (13):

$$\alpha ref = Gff \cdot Ai + Gy \cdot \theta y + Gf \cdot \delta \quad (13)$$

where

Gff denotes a feedforward gain for the curvature component Ai of the target route, Gy denotes a feedback gain for the relative yaw angle θy between the target route and the own vehicle, and Gf denotes a feedback gain for the lateral position deviation δ between the target route and the own vehicle when advancing at the current steering angle.

Non-limiting examples of the steering control amounts may include: a steering control amount of the feedforward control for the curvature component Ai of the route; a steering control amount of the feedback control for a relative yaw angle θy between the route and the own vehicle based on the yaw angle component Bi of the route; and a steering control amount of the feedback control for the deviation δ between the target point and the estimated lateral position of the own vehicle based on the lateral position component Ci of the route. The calculated target steering angle αref may be outputted to the steering controller 70.

The steering controller 70 may perform an arithmetic operation that calculates target steering torque on the basis of deviation between the target steering angle αref and an actual steering angle to control the electric power steering motor. The control of the electric power steering motor to have the calculated target steering torque may be performed specifically as an electric current control of the electric power steering motor. For example, the electric power steering motor may be driven by a drive current under proportional-integral-derivative (PID) control.

Figure 8:
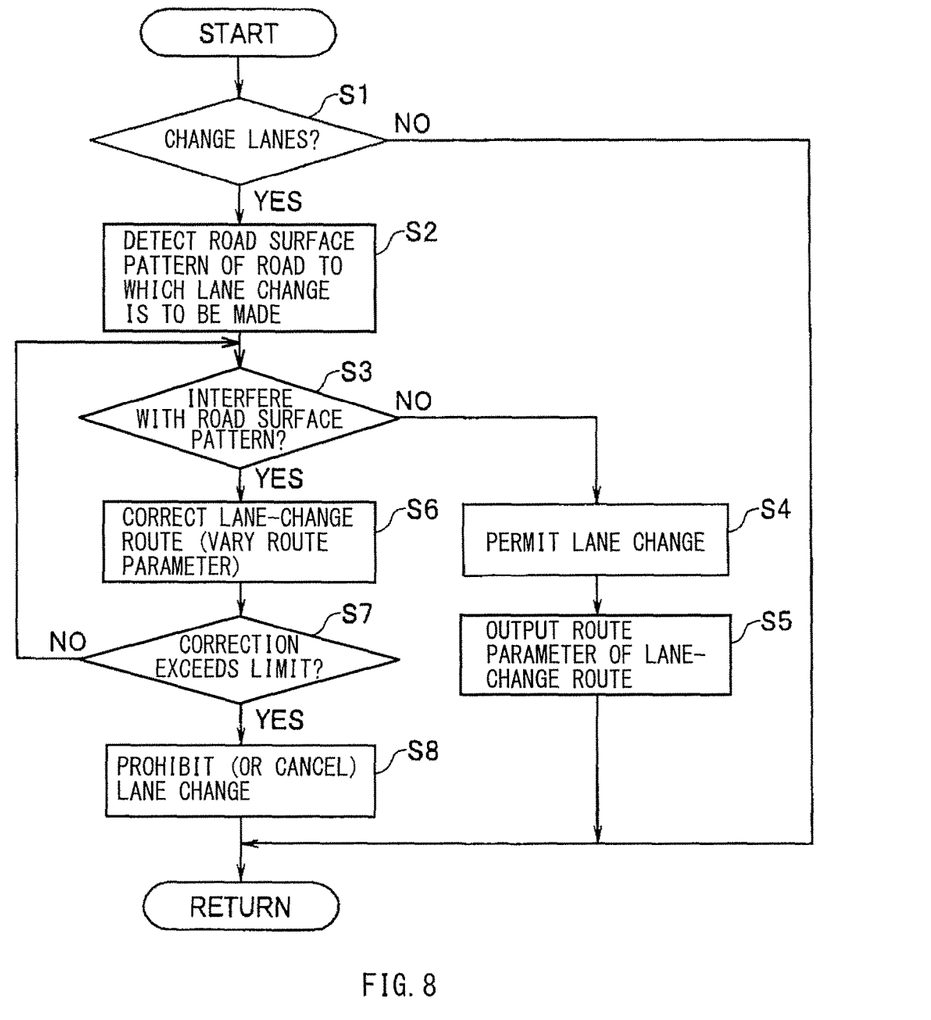
FIG. 8 is a flowchart of an example of a traveling control.

Description is given next of a program processing of the lane change of the traveling control performed in the traveling controller 100, with reference to a flowchart illustrated in FIG. 8.

In the traveling control, checking may be performed, in first Step S1, as to whether a timing for starting the lane change is satisfied, such as a timing when the driver actuates the direction indicator. When the timing for starting the lane change is not satisfied, the flow may exit the main processing. When the timing for starting the lane change is satisfied, the flow may proceed to Step S2, in which detection may be performed for the road surface pattern of the road to which the lane change is to be made.

Thereafter, the flow may proceed to Step S3, in which determination may be made as to whether the own vehicle interferes with the road surface pattern of the road to which the lane change is to be made when traveling through the lane-change route set with the route model. As a result, when determination is made that the own vehicle does not interfere with the road surface pattern of the road to which the lane change is to be made, the flow may proceed from Step S3 to Step S4. In Step S4, the previously set lane-change route may be finalized as the final lane-change route to permit the lane change. Thereafter, the flow may proceed to Step S5.

In Step S5, the route parameters such as the curvature component D, the yaw angle component E, and the lateral position component F of the finalized lane-change route may be outputted. The route components D, E, and F of the lane-change route may be added, respectively, to the route components A, B, and C of the target route before the lane change to perform the steering control for the lane change.

In contrast, when determination is made, in Step S3, that the own vehicle interferes, on the lane-change route, with the road surface pattern of the road to which the lane change is to be made, the flow may proceed from Step 3 to Step S6. In Step S6, the route parameters L and H of the route model may be varied from initial values to correct the lane-change route. Thereafter, determination may be made, in Step S7, as to whether the route parameters L and H exceed the upper limit or the lower limit within the correctable range.

When the correction of the lane-change route made by the route parameters L and H does not exceed the limit in Step S7, the flow may return to Step S3 from Step S7. In Step S3, determination may be made as to whether there is the interference. When there is still the interference, the flow may continue the route correction in Step S6. When there is not the interference any more as a result of the correction of the lane-change route, the route parameters such as the curvature component D, the yaw angle component E, and the lateral position component F of the lane-change route finalized through the above-described Steps S4 and S5 may be outputted.

In contrast, when determination is made, in Step S7, that the correction of the lane-change route exceeds the limit, the correction of the lane change may be stopped. Thereafter, the flow may proceed from Step S7 to Step S8, in which the lane change may be prohibited or canceled.

As described above, according to the implementation of the technology, the road surface pattern is detected, which is formed by the irregular part on the road to which the lane change is to be made. Further, determination is made as to whether the own vehicle that is to travel through the lane-change route interferes with the road surface pattern. The lane-change route is generated using the route model. When the own vehicle does not interfere, on the lane-change route, with the road surface pattern, the lane change through the lane-change route is performed. When the own vehicle interferes, on the lane-change route, with the road surface pattern, the lane-change route is corrected, thereby making it possible to perform proper lane change. When the correction of the lane-change route exceeds the limit within the correctable range, the lane change is prohibited or canceled, thereby making it possible to prevent possible occurrence of any concern.

The traveling controller 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the traveling controller 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling controller 100 illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
   a setter configured to set, when controlling a lane change, a lane-change route on a basis of a route parameter of a zone in which the lane change is performed and a route parameter of a lateral movement of the lane change, the lane-change route serving as a route through which an own vehicle is to proceed to an adjacent lane from a current target route of the own vehicle, the lane change allowing for movement from a traveling lane to the adjacent lane, the traveling lane being a lane along which the own vehicle travels, the adjacent lane being positioned next to the traveling lane;
   a detector configured to detect a road surface pattern formed by an irregular part on a surface of a road to which the lane change is to be made during the lane change; and
   a determiner configured to determine whether the own vehicle interferes, on the lane-change route, with the road surface pattern, and instruct, on a basis of a result of the determination, correction of the lane-change route set by the setter,
   wherein, in a case where determination is made that the own vehicle does not interfere with the road surface pattern, the determiner permits the lane change through the lane-change route, and
   wherein, in a case where determination is made that the own vehicle interferes with the road surface pattern, the determiner instructs the setter to correct the lane-change route,
   wherein, in a case where determination is made that the own vehicle interferes with the road surface pattern, the determiner instructs correction of the route parameter of the zone,
   wherein, in a case where determination is made that the own vehicle interferes with the road surface pattern even if the correction of the route parameter of the zone is made to a limit, the determiner instructs correction of the route parameter of the lateral movement by returning the route parameter of the zone to initial value, and
   wherein, in a case where determination is made that the own vehicle interferes with the road surface pattern even if the correction of the route parameter of the lateral movement is made to a limit, the determiner instructs prohibition or cancelation of the lane change.

2. The vehicle traveling control apparatus according to claim 1, wherein the detector detects, as the road surface pattern, a region that has a texture on an image and height or depth, the height or the depth being equal to or greater than a threshold value in a vertical direction with respect to height of the road surface at a lane.

3. The vehicle traveling control apparatus according to claim 2, wherein the setter determines a route component of the lane-change route by developing the lane-change route into a sequence of points using a route model, and by approximating the developed sequence of points using a quadratic function.

4. The vehicle traveling control apparatus according to claim 1, wherein the setter determines a route component of the lane-change route by developing the lane-change route into a sequence of points using a route model, and by approximating the developed sequence of points using a quadratic function.

5. A vehicle traveling control apparatus comprising circuitry configured to
   set, when controlling a lane change, a lane-change route on a basis of a route parameter of a zone in which the lane change is performed and a route parameter of a lateral movement of the lane change, the lane-change route serving as a route through which an own vehicle is to proceed to an adjacent lane from a current target route of the own vehicle, the lane change allowing for movement from a traveling lane to the adjacent lane, the traveling lane being a lane along which the own vehicle travels, the adjacent lane being positioned next to the traveling lane,
   detect a road surface pattern formed by an irregular part on a surface of a road to which the lane change is to be made during the lane change,
   determine whether the own vehicle interferes, on the lane-change route, with the road surface pattern, and instruct, on a basis of a result of the determination, correction of the set lane-change route,
   wherein, in a case where determination is made that the own vehicle does not interfere with the road surface pattern, the circuitry permits the lane change through the lane-change route,
   wherein, in a case where determination is made that the own vehicle interferes with the road surface pattern, the circuitry instructs the correction of the lane-change route,
   wherein, in a case where determination is made that the own vehicle interferes with the road surface pattern, the circuitry instructs correction of the route parameter of the zone,
   wherein, in a case where determination is made that the own vehicle interferes with the road surface pattern even if the correction of the route parameter of the zone is made to a limit, the circuitry instructs correction of the route parameter of the lateral movement by returning the route parameter of the zone to initial value, and wherein, in a case where determination is made that the own vehicle interferes with the road surface pattern even if the correction of the route parameter of the lateral movement is made to a limit, the circuitry instructs prohibition or cancelation of the lane change.

* * * * *